(12) United States Patent
Doll

(10) Patent No.: US 8,392,264 B2
(45) Date of Patent: Mar. 5, 2013

(54) SYSTEMS AND METHODS OF PROVIDING A GUARANTEED PRICE FOR A USED DURABLE GOOD

(75) Inventor: Thomas J. Doll, Lafayette Hill, PA (US)

(73) Assignee: Subaru of America, Inc., Cherry Hill, NJ (US)

( * ) Notice: Subject to any disclaimer, the term of this patent is extended or adjusted under 35 U.S.C. 154(b) by 834 days.

(21) Appl. No.: 12/230,428

(22) Filed: Aug. 28, 2008

(65) Prior Publication Data

US 2009/0063303 A1 Mar. 5, 2009

Related U.S. Application Data

(60) Provisional application No. 60/935,809, filed on Aug. 31, 2007.

(51) Int. Cl.
*G06Q 30/00* (2006.01)
(52) U.S. Cl. .................................................. 705/26.1
(58) Field of Classification Search ............... 705/26–27
See application file for complete search history.

(56) References Cited

U.S. PATENT DOCUMENTS

| | | | |
|---|---|---|---|
| 5,826,240 A | 10/1998 | Brockman et al. | |
| 2002/0026409 A1 | 2/2002 | Nozaki | |
| 2002/0035520 A1 | 3/2002 | Weiss | |
| 2003/0065583 A1 | 4/2003 | Takaoka | |
| 2005/0086070 A1 | 4/2005 | Engelman | |
| 2005/0108112 A1* | 5/2005 | Ellenson et al. | 705/27 |
| 2005/0144061 A1 | 6/2005 | Rarity et al. | |
| 2005/0267774 A1 | 12/2005 | Merritt et al. | |
| 2006/0242089 A1 | 10/2006 | Vahidi et al. | |
| 2007/0073605 A1 | 3/2007 | Kohavi et al. | |
| 2007/0162293 A1 | 7/2007 | Malkon | |
| 2007/0239721 A1 | 10/2007 | Ullman et al. | |

FOREIGN PATENT DOCUMENTS

JP 2001344463 12/2001

OTHER PUBLICATIONS

"Automakers Offer Customer Perks" (Adams, S., National Post, Apr. 27, 2006, p. JV7).*
"Painesville Township, Ohio, Subaru, Suzuki, Dealer Grows" (Baker, B., Knight Ridder Tribune Business News, Jun. 28, 2006, p. 1).*
"Kelley Blue Book Celebrates 80 Years of Trust; Rich History Allows Company to Offer More Information, Services" (PR Newswire, Oct. 11, 2006).*
Openlane.com, "The Summer's Best Offer! $150 Transport Incentive and Buy Back Guarantee on Select Trucks and SUVs," Aug. 2008, 3 pages.
Subaru, "GTP Guaranteed Trade-In Price" slides, Dec. 2005, 10 pages.
Subaru, "There Are Few Guarantees in Life. Now Your Trade-In Value is One of Them," advertisements, 2006, 6 pages.

* cited by examiner

*Primary Examiner* — Jeffrey A Smith
*Assistant Examiner* — Ethan D Civan
(74) *Attorney, Agent, or Firm* — Finnegan, Henderson, Farabow, Garrett & Dunner, L.L.P.

(57) ABSTRACT

Systems and methods are provided for periodically calculating a guaranteed price for a used durable good, such as an automobile. The current guaranteed price is continuously accessible by an owner of the used durable good for an extended period, and the owner can receive at least the value of the guaranteed price at the owner's discretion. A guarantor of the calculated guaranteed price backs a transaction that ensures that the owner receives at least the value of the current guaranteed price in exchange for the used durable good. The transaction may include a trade-in of the used durable good.

22 Claims, 6 Drawing Sheets

SYSTEMS AND METHODS OF PROVIDING A GUARANTEED PRICE FOR A USED DURABLE GOOD

This application claims the benefit of U.S. Provisional Application No. 60/935,809, filed Aug. 31, 2007, entitled "Perpetual Guaranteed Trade-In Program," which is incorporated herein by reference.

DESCRIPTION OF THE INVENTION

1. Field of the Invention

The present invention generally relates to transactions for durable goods, and more particularly, to systems and methods for offering a guaranteed minimum amount for a specified used durable good, such as an automobile, as an incentive to enter a purchase transaction, which may include a trade-in.

2. Background

When a consumer purchases a vehicle, often he will "trade-in" an old vehicle, such as a car, motorcycle, ATV, boat, etc., to receive credit or an allowance toward the new purchase. In the past, vehicle dealers and manufacturers occasionally offered time-limited trade-in programs that offered a specific trade-in price to encourage specific vehicle owners to trade-in old vehicles in favor of newer models. Under these limited programs, a dealer or manufacturer would typically set a certain trade-in value for a particular vehicle, based on the make, model, equipment, age, and other characteristics of the vehicle. For example, a car manufacturer, such as Subaru, might determine that a trade-in value for a 2006 Subaru Outback, 3.0R LL Bean model, will be $20,000 if the car is traded in as part of a transaction to purchase a new Subaru vehicle during the next 30 days. The dealer or manufacturer might then search its records for owners of 2006 Outbacks, 3.0R LL Bean model, and directly contact each owner with a short-term guaranteed trade-in offer.

These prior systems had only modest success, due in large part to their strictly limited nature. Dealers and manufacturers wishing to offer a guaranteed trade-in program had to prepare trade-in values for specific cars, identify potential trade-in participants, and spend time and expense directly contacting each of the limited number of potential trade-in customers that could be identified. All of these steps had to be repeated each time a manufacturer wanted to run a guaranteed trade-in promotion. This process was inefficient, as many of the potential customers that a manufacturer or dealer could identify from their sales records no longer owned the vehicle or were otherwise not in the market to trade-in for a new car. Also, many of the current owners of target vehicles could not be identified by dealers and manufacturers because those owners had purchased their vehicle used from some other source. Furthermore, many consumers react adversely to direct marketing attempts, and the high pressure of having to act within a limited period of time was a disincentive to many consumers.

It is accordingly desirable to provide systems and methods that address the drawbacks of previous trade-in programs.

SUMMARY OF THE INVENTION

In accordance with embodiments of the present invention, a method using a data processing system provides a guaranteed price for a durable good in a transaction by establishing a set of durable goods eligible for the transaction. A durable good is kept in the set of durable goods until the durable good is at least two years old, and a guaranteed price for each durable good in the set of durable goods is periodically calculated. An owner-accessible interface is provided for an owner of a durable good included in the set to learn the guaranteed price of the durable good, and the transaction is continually offered to the owner of the durable good, including a value equal to or greater than the guaranteed price offered in exchange for the durable good, while the durable good remains in the set of durable goods. The value equal to or greater than the guaranteed price is provided to the owner of the durable good in exchange for the durable good, when the owner enters into the transaction.

Other embodiments of the present invention provide a method for selling or leasing a new vehicle using a computer system. Guaranteed prices for at least two previous model years of vehicles made by a manufacturer of the new vehicle are periodically calculated, and the guaranteed prices are made accessible to owners of the previous model years of vehicles. An owner of a previous model year vehicle is continually offered a trade-in allowance toward the purchase or lease of the new vehicle, the trade-in allowance being equal to a current guaranteed price calculated for the previous model year vehicle. Finally, the new vehicle is sold or leased to the owner of the previous model year vehicle for a new vehicle price discounted by the trade-in allowance for the current guaranteed price, when the previous model year vehicle is traded in.

Still other embodiments provide a system for providing a guaranteed price used in a transaction for a vehicle including a guarantor computing component controlled by a guarantor that defines a set of used vehicles eligible to be used in the transaction, removes a used vehicle from the set of used vehicles when the used vehicle exceeds an age threshold, periodically calculates current guaranteed prices corresponding to the used vehicles in the set of used vehicles, stores terms of the transaction, which uses the current guaranteed prices, and provides access to the calculated current guaranteed prices and the terms of the transaction.

The system further includes a web server, communicatively connected to the guarantor computing component via a network, that accepts information identifying a used vehicle from an owner of the used vehicle, retrieves the calculated current guaranteed price corresponding to the used vehicle and the terms of the transaction, which uses the calculated guaranteed price, via the guarantor computing component, displays an offer to enter into the transaction and the terms of the transaction to the owner of the used vehicle, and displays the calculated current guaranteed price corresponding to the used vehicle to be used in the transaction to the owner of the used vehicle.

The system further includes an affiliate computing component, communicatively connected to the guarantor computing component and the web server via the network, that displays the calculated current guaranteed price for the used vehicle and the terms of the transaction to an affiliate that enters into the transaction with the owner of the used vehicle, wherein the affiliate takes ownership of the used vehicle in exchange for a value equivalent to the calculated current guaranteed price, and facilitates sale of the used vehicle from the affiliate to the guarantor for the current guaranteed price.

Additional aspects and advantages of the invention will be set forth in part in the description which follows, and in part will be obvious from the description, or may be learned by practice of the invention. The aspects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to exemplary embodiments of the invention, examples of which are illustrated in the accompanying drawings. Wherever convenient, the same reference numbers will be used throughout the drawings to refer to the same or like parts.

Figure 1:
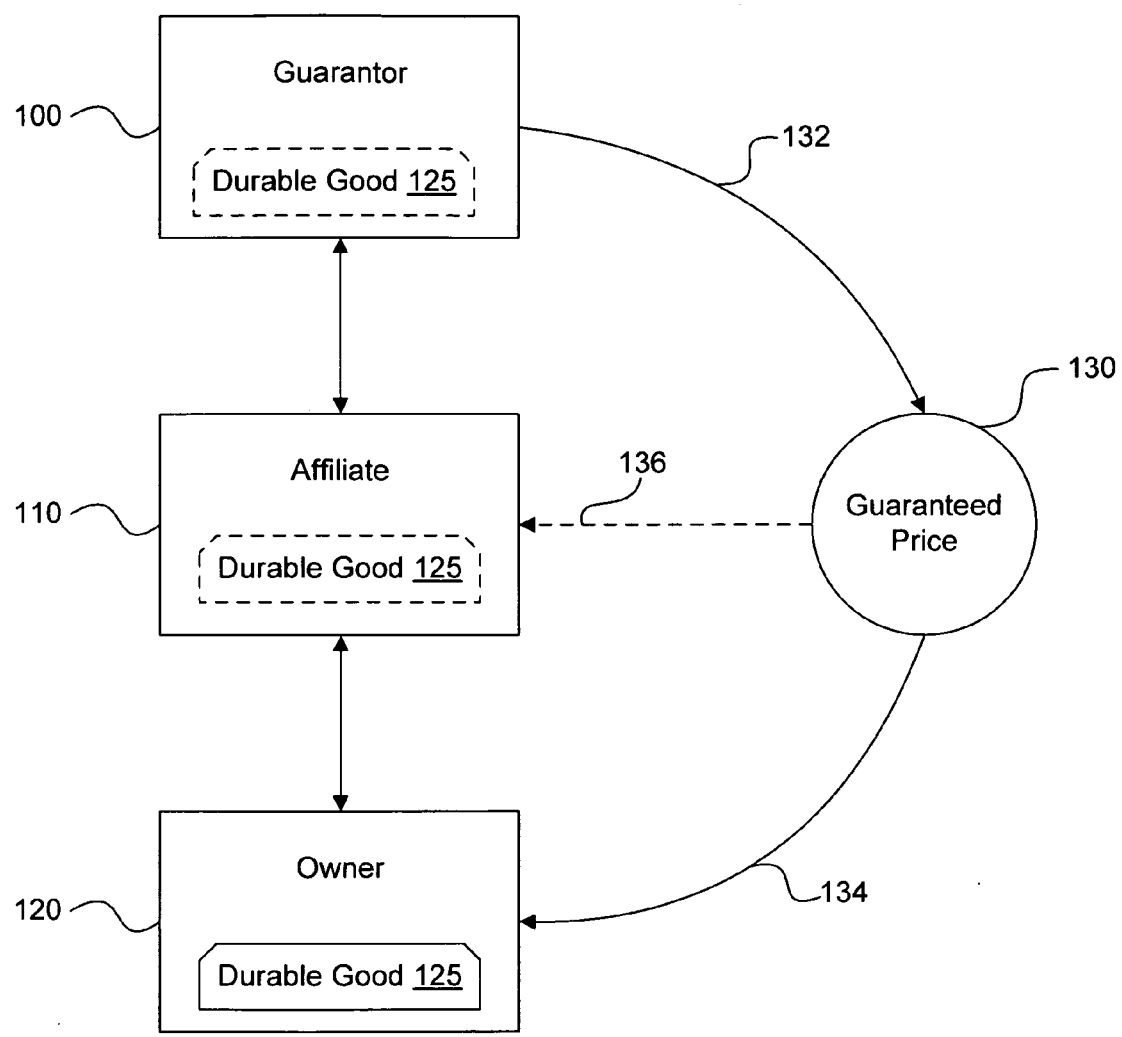
FIG. 1 is a block diagram showing an example of the relationships between entities involved with a guaranteed price system consistent with principles of the invention.

FIG. 1 shows an example of the relationships between entities involved with a guaranteed price system consistent with principles of the invention. As shown, a guarantor 100 may generate a guaranteed price 130 for a specific used durable good 125. Durable goods may include vehicles, appliances, business equipment, electronic equipment, home furnishings and fixtures, durable house wares and accessories, photographic equipment, and durable recreational goods, among other things. In one embodiment, guarantor 100 may be a manufacturer of durable goods, such as an automobile manufacturer or an appliance manufacturer. In another embodiment, guarantor 100 may be an entity whose business is providing guaranteed prices for used durable goods for a fee. In other embodiments, a guarantor may be some other entity.

In one embodiment, guaranteed price 130 is the minimum amount of value that guarantor 100 will provide in exchange for the specified durable good 125 at the current time. Guarantee price 130 is not merely an estimate that no one is obligated to pay in exchange for durable good 125; instead guaranteed price 130 is a firm offer for the specified durable good 125 backed by guarantor 100. For example, guarantor 100 may be the automobile manufacturer Subaru that sets a guaranteed price 130 of $20,000 for a 2006 Subaru Outback, 3.0R LL Bean model, that meets specified eligibility criteria. In one embodiment, the eligibility criteria includes the type of transaction that is required to receive guaranteed price 130. For example, the eligibility criteria may require that a guaranteed price 130 of $20,000 will be an allowance for a 2006 Subaru Outback, 3.0R LL Bean model, that must be used as a trade-in to buy a new car from a Subaru dealership.

As represented by arrows 132 and 134, guarantor 100 makes guaranteed price 130 continuously accessible to an owner 120 of specified durable good 125, such that owner 120 can retrieve current guaranteed price 130 offered by guarantor 100 at owner 120's discretion. In one embodiment, guarantor 100 makes guaranteed price 130 accessible via a website that owner 120 can access over the Internet. For example, an owner 120 of a 2006 Subaru Outback, 3.0R LL Bean model may interact with a website to retrieve the $20,000 guaranteed price 130 currently being offered by guarantor 100 for that specific vehicle. In another embodiment, guarantor 100 makes guaranteed price 130 accessible via an interactive voice response system that owner 120 can access over a telephone network. In yet another embodiment, guarantor 100 makes guaranteed price 130 accessible via a web feed that owner 120 can register for. Other ways of making guaranteed price 130 easily accessible to owner 120 may also be used.

In the embodiment shown in FIG. 1, owner 120 obtains the value of current guaranteed price 130 in a transaction with an affiliate 110 by conveying specified durable good 125 to affiliate 110 in exchange for guaranteed price 130. As represented by arrow 136, affiliate 110 may also be able to access guaranteed price 130. Affiliate 110 may access guaranteed price 130 in order to verify the amount to provide to owner 120 in exchange for specified durable good 125, to offer guaranteed price 130 to owner 120 in cases where owner 120 is unaware of guaranteed price 130, or for other reasons.

In the embodiment shown in FIG. 1, affiliate 110 is associated with guarantor 100, such that affiliate 110 may seek to sell to guarantor 100 specified durable good 125 received from owner 120 in exchange for guaranteed price 130. In one embodiment, guarantor 100 pays the current guaranteed price 130 to affiliate 110 for a durable good 125 obtained from owner 120 according to the guaranteed price conditions. For example, affiliate 110 may be a Subaru dealership that sells to Subaru corporation the 2006 Subaru Outback, 3.0R LL Bean model, obtained from owner 120 for the guaranteed price 130 of $20,000. In another embodiment, guarantor 100 pays a previous guaranteed price 130 to affiliate 110, where that previous price was current at the time that affiliate 110 accepted specified durable good 125 from owner 120. In another embodiment, guarantor 100 provides value equal to guaranteed price 130 to affiliate 110 in a form other than money, such as, for example, goods or services. In other embodiments, guarantor 100 may reimburse guarantee price 130 to affiliate 110 in other ways.

In some embodiments, affiliate 110 may elect to retain durable good 125 obtained from owner 120 instead of selling to guarantor 100. For example, affiliate 110 may retain the 2006 Subaru Outback, 3.0R LL Bean model obtained from owner 120 for the guaranteed price 130 of $20,000 in order to sell the vehicle to a retail customer for $23,000 instead of selling the vehicle to guarantor 100 for the guaranteed price 130 of $20,000.

The embodiment shown in FIG. 1 is only one example of the possible relationships and entities involved with guaranteed price systems and methods consistent with the principles of the invention. For example, in one embodiment, there is no affiliate 110 and owner 120 interacts directly with guarantor 100. Other relationships and entities may also be used.

Figure 2:
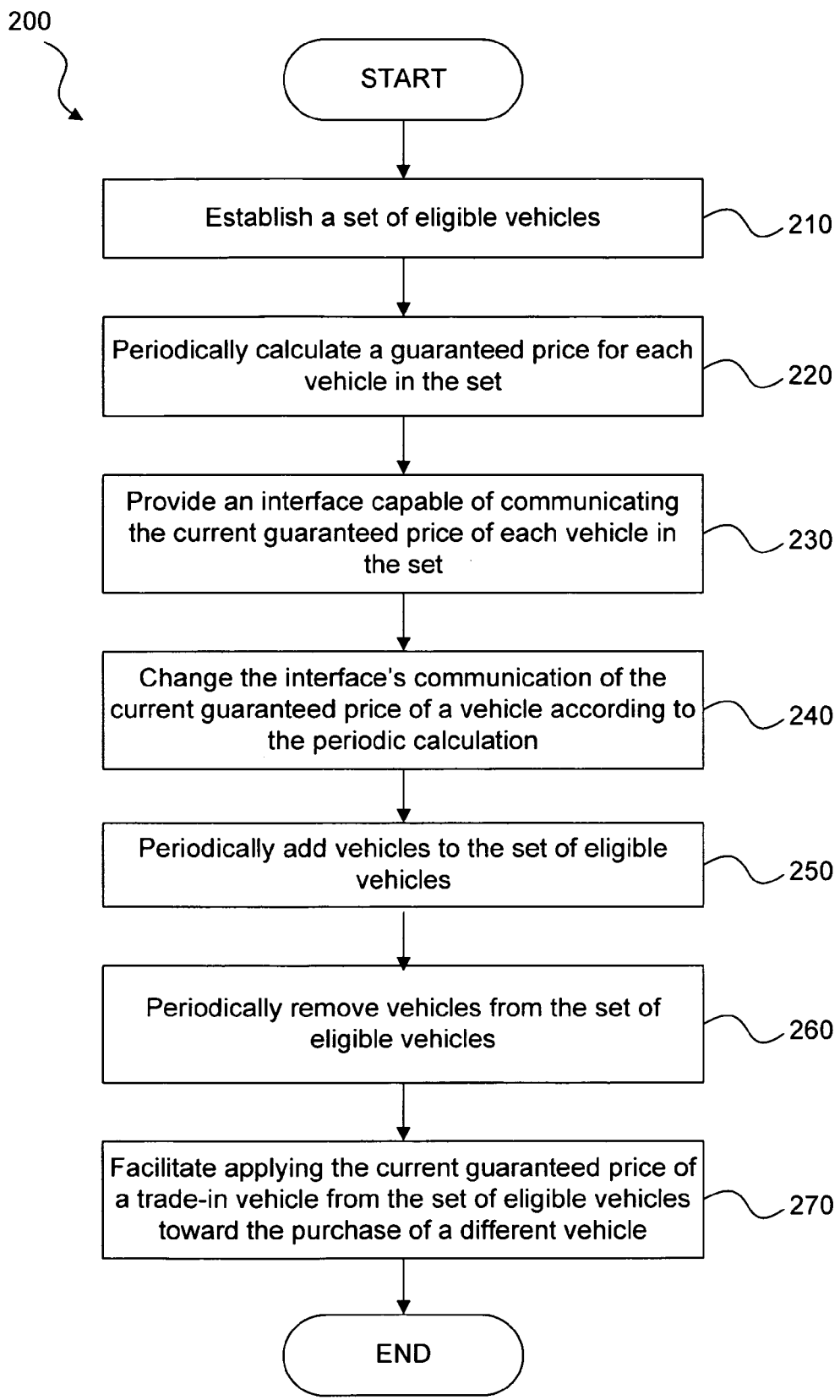
FIG. 2 is a diagram illustrating an example of a process for providing a guaranteed price for a used durable good, consistent with principles of the invention.

FIG. 2 is a diagram illustrating an example of a process 200 for providing a guaranteed price for a used durable good, consistent with principles of the invention. The embodiment shown in FIG. 2 applies to vehicles as an example of a durable good. Other embodiments may be applied to other types of durable goods. In one embodiment, process 200 may be performed by or under the control of a guarantor 100.

As shown in the embodiment of FIG. 2, process 200 begins with establishing a set of vehicles (stage 210). In general, a set of durable goods, such as the set of vehicles in this embodiment, may be defined based on the useful lifespan or value lifespan of the durable good. For example, vehicles may have a five to seven year useful lifespan, household appliances may have a seven to ten year useful lifespan, and industrial equipment may have a seven to 15 year useful lifespan. In the vehicle embodiment shown in FIG. 2, an automobile manufacturer may, for example, establish the set of vehicles to include all the vehicles produced by that manufacturer during the previous five model years. For another example, an automobile manufacturer may establish the set of vehicles to include only the passenger cars produced by that manufacturer during the previous six model years, excluding trucks and SUVs. Other criteria for establishing the set of vehicles may also be used. The specific vehicles contained in the set may be identified by model codes and model years, in one embodiment.

Next, process 200 periodically calculates a guaranteed price 130 for each vehicle in the set of vehicles (stage 220). Thus, the calculated guaranteed price 130 changes over time. In one embodiment, the guaranteed price 130 for each vehicle is calculated bimonthly, for example, on January 1, March 1, May 1, July 1, September 1, and November 1. In another embodiment, the guaranteed price 130 for each vehicle is calculated monthly. Other time periods may be used.

In one embodiment, guaranteed price 130 may be a trade-in price that a vehicle manufacturer will guarantee to an owner 120 of a used vehicle in the set of vehicles, provided the used vehicle meets specified condition and mileage criteria. For example, the criteria may specify that a used automobile must conform to automobile industry standards for normal wear and mileage based on its age, and the used automobile must be in safe operating condition and free of existing and/or previously repaired paint and collision damage.

In one embodiment where guaranteed price 130 is a trade-in price, the guaranteed trade-in price must be applied toward the purchase or lease of a new vehicle specified by guarantor 100 (e.g., the vehicle manufacturer). In another embodiment, the guaranteed trade-in price is an allowance toward the purchase or lease of a used vehicle specified by a vehicle manufacturer in the role of guarantor 100. In other embodiments, the guaranteed trade-in price may be applied toward the purchase or lease of something other than solely a vehicle, such as a specified non-vehicular good, or a service, or some combination of vehicles, goods, and services.

In some embodiments, the guaranteed price 130 for a specific vehicle is calculated taking into account an industry guidebook price estimate or estimates for the vehicle, such as the price estimate or estimates listed in the Automotive Lease Guide™ (ALG), Kelley Blue Book™, Online Kelley Blue Book™, Black Book™, or N.A.D.A.™, Guide. In some embodiments, the guaranteed price calculation may also take into account local secondary market auction sale prices, local retail sale prices, future near term price depreciation, and other factors. In one embodiment, the calculated guaranteed price 130 for a specific vehicle is higher than the highest price estimate currently listed in any industry guidebook, which provides an incentive for owner 120 to enter into a transaction with affiliate 110 who offers guaranteed price 130, instead of selling the used vehicle for less elsewhere.

As shown in FIG. 2, process 200 also provides an easily accessible interface that is capable of communicating the current guaranteed price of each vehicle in the set of vehicles (stage 230). Thus, an owner 120 of a vehicle in the set of vehicles has access to the current guaranteed price 130 for the vehicle whenever owner 120 desires, and owner 120 may receive the value of guaranteed price 130 in exchange for the vehicle for as long as the vehicle remains in the set of guaranteed-price vehicles. In some embodiments, the current guaranteed price is accessible via a website, and/or via an interactive voice response system, and/or via a web feed, and/or via periodic emails coinciding with the periodic guaranteed price changes. Other interfaces for communicating current guaranteed prices 130 may also be used.

Process 200 periodically changes the current guaranteed price communicated by the interface(s) according to the periodic calculation (stage 240). In this embodiment, when a user, such as owner 120, interacts with the provided interface, the interface provides the most recently calculated (i.e., current) guaranteed price 130 for vehicles within the established set of vehicles. In one embodiment, the interface(s) also provides a "good until" date that is disclosed with a vehicle's guaranteed price 130. The good until date coincides with the next guaranteed-price-setting date, as explained in connection with stage 220 of process 200. For example, in a bimonthly periodic calculation implementation where the next calculation occurs on January 1, a guaranteed price 130 obtained from the interface on November 10 would be good until December 31. In a bimonthly implementation, the life of a guaranteed price 130 is a minimum of one and a maximum of sixty days, depending upon when the user retrieves guaranteed price 130.

Process 200 may also periodically add vehicles to the set of vehicles (stage 250). In one embodiment, a vehicle manufacturer may add the manufacturer's second previous model year vehicles to the set of vehicles at the start of each new model year. For example, a motorcycle manufacturer may add 2007 model year motorcycles to the set of vehicles for which a guaranteed price is provided at the beginning of the 2009 model year, and then add 2008 model year motorcycles to the set of vehicles at the beginning of the 2010 model year, and so on. Other ways of determining which vehicles to add to the set of eligible vehicles, and when to add them, may also be used.

Process 200 may also periodically remove vehicles from the set of vehicles (stage 260). In one embodiment, a vehicle manufacturer may remove vehicles from model years beyond a specified limit from the set of vehicles at the start of each new model year. For example, a boat retailer may remove 1997 model year boats from the set of vehicles for which a guaranteed price is provided at the beginning of the 2009 model year, and then remove 1998 model year boats from the set of vehicles at the beginning of the 2010 model year, and so on. In another embodiment, different types of vehicles may be removed from the set of vehicles at different times. For example, an automobile manufacturer may remove 2002 model year cars and 2004 model year pickup trucks from the set of vehicles for which a guaranteed price is provided at the beginning of the 2009 model year. Other ways of determining which vehicles to remove from the set of eligible vehicles, and when to remove them, may also be used.

Process 200 may also facilitate applying the current guaranteed price of a vehicle from the set of vehicles toward the purchase of a different vehicle (stage 270). In one embodiment, guarantor 100 may facilitate applying the current guaranteed price of a vehicle from the set of vehicles toward the purchase of a different vehicle by buying the vehicle from affiliate 110 after affiliate 110 obtains the vehicle from owner 120 in exchange for the current guaranteed price 130. For example, an automobile manufacturer may pay guaranteed price 130 to a dealer for a used automobile that the dealer accepted from a customer as a trade-in toward the purchase or lease of a new automobile, where the dealer gave the customer guaranteed price 130 as an allowance that reduced the purchase price of the new vehicle. As another example, an automobile reconditioner may pay guaranteed price 130 to a dealer for a used automobile that the dealer accepted from a customer as a trade-in toward the purchase or lease of a used automobile that was previously reconditioned by the automobile reconditioner. In some embodiments, process 200 may facilitate the trade-in of a used vehicle by calculating a guaranteed price 130 that is set higher than the value that an owner 120 of the used vehicle could obtain elsewhere in the market.

Although process 200 is explained using a vehicle as an example, process 200 may be applied to other kinds of durable goods in addition to vehicles. Moreover, process 200 may have stages added, deleted, reordered, or modified without departing from the principles of the invention. For example, stage 270 may be modified such that the current guaranteed price 130 is paid directly to an owner of a vehicle in the established set of vehicles, instead of as an allowance for the vehicle being used as a trade-in.

Figure 3:
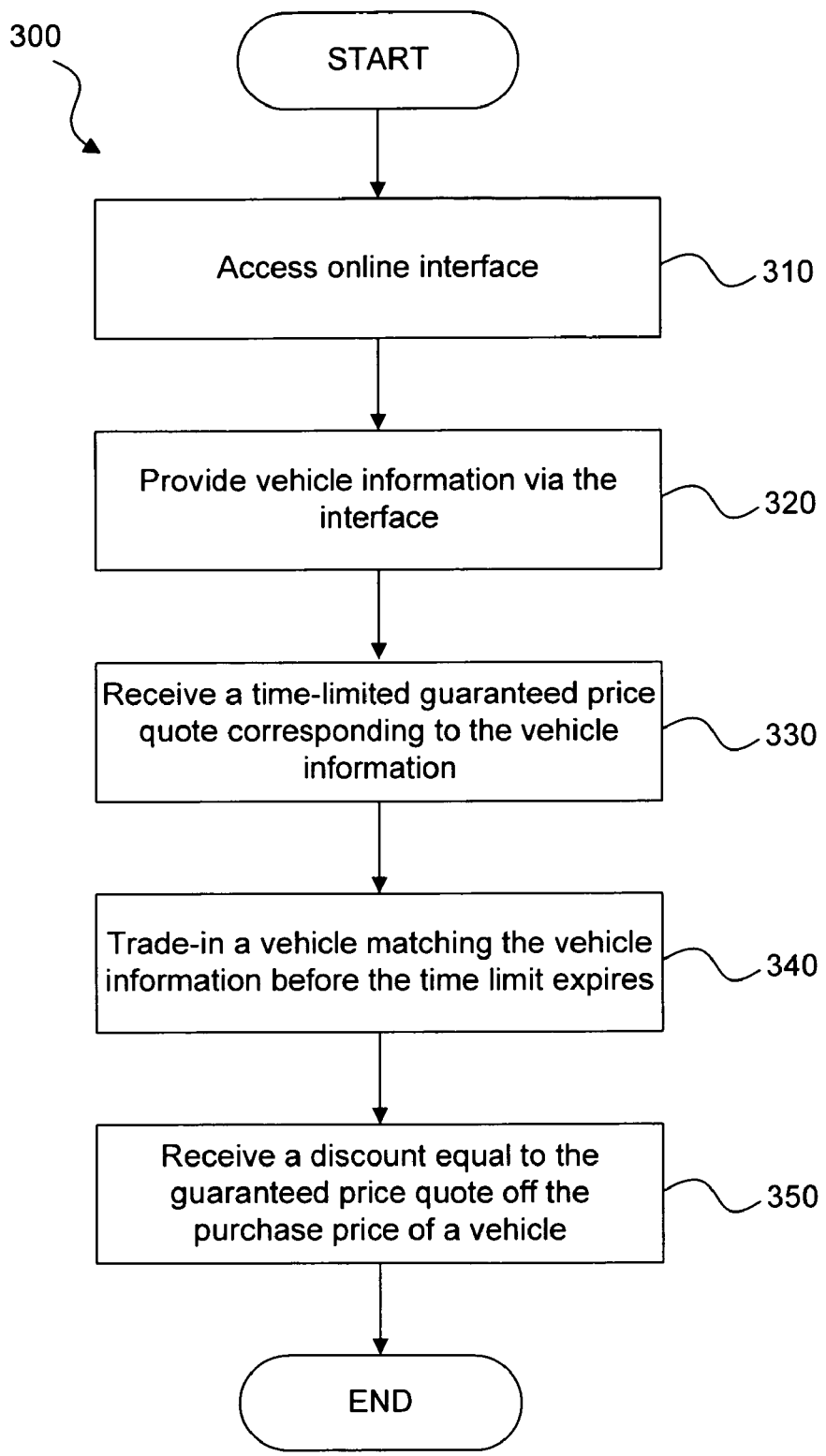
FIG. 3 is a diagram illustrating an example of a process for using a guaranteed price for a used durable good, consistent with principles of the invention.

FIG. 3 is a diagram illustrating an example of a process 300 for utilizing a guaranteed price for a used durable good, consistent with the principles of the invention. In the embodiment shown, process 300 begins with accessing an interface that provides guaranteed price information (stage 310). In one embodiment, a user, such as an owner 120 of a vehicular durable good 125, enters a URL into a web browser to access the interface, after a guarantor 100 sets up the web server with the interface. In other embodiments, the interface may not be online, for example a telephonic interactive voice response interface may be used. Other types of interfaces may also be used.

In stage 320, vehicle information is provided to the accessed interface. For example, a user may submit a vehicle's make, model, trim line, and model year information, or a unique identification number, such as a serial number or vehicle identification number (VIN), by filling in forms on a web interface using a browser. Other ways of providing vehicle information may also be used. Other information about the vehicle may also be submitted, such as information about optional equipment, mileage, condition, etc.

Next, at stage 330, the user may receive a current guaranteed price 130 corresponding to the vehicle information submitted in stage 320, if the submitted vehicle information corresponds to a vehicle in the set of eligible vehicles. In one embodiment, current guaranteed price 130 is displayed to a user via a web browser. In other embodiment the user may receive the current guaranteed price in other ways, for example via audio information, via email, etc. In one embodiment, current guaranteed price 130 is valid until a new guaranteed price 130 is calculated on a periodic basis, and the user is notified regarding the period of validity.

In addition to guaranteed price 130 and information regarding when guaranteed price 130 will next be recalculated, the interface may present other information to the user. For example, the interface may present vehicle eligibility criteria for determining whether an owner 120 may receive the value of guaranteed price 130 in exchange for the vehicle, such as maximum mileage criteria, acceptable vehicle condition descriptions, ownership criteria, inspection criteria, criteria on the transaction required to receive the value of the guaranteed price for the vehicle, adjustment criteria for mileage, etc. For another example, the interface may present market value information, such as the current price estimates for the vehicle listed in the Automotive Lease Guide™ (ALG), Kelley Blue Book™, Online Kelley Blue Book™, Black Book™, or N.A.D.A.™ Guide, for comparison to guaranteed price 130.

At stage 340, the vehicle matching the submitted vehicle information is traded in while current guaranteed price 130 is valid. In one embodiment, the owner 120 of the vehicle may bring the vehicle to an affiliate 110 related to the guarantor 100 that provided guaranteed price 130 and trade-in the vehicle.

Process 300 continues at stage 350, where an allowance based on the guaranteed price of the traded-in vehicle is received toward the purchase or lease of a different vehicle. In one embodiment, an owner 120 of a trade-in vehicle receives at least the value of the guaranteed price for the trade-in vehicle as a discount off the purchase price of a new vehicle. In some embodiments, the allowance received for the traded-in vehicle may be adjusted based on the condition of the vehicle. For example, the allowance may be more than guaranteed price 130 if the vehicle has mileage significantly below a target mileage (e.g., significantly less than 15,000 miles) used to calculate guaranteed price 130, or the allowance may be less than guaranteed price 130 if the vehicle has mileage above the target mileage (e.g., more than 15,000 miles) used to calculate guaranteed price 130. The allowance may also be adjusted for other reasons such that it differs from guaranteed price 130. In other embodiments, different transactions involving adjusting an allowance, adjusting a value, or exchanging the vehicle for value equal to guaranteed price 130 may also be used.

Although process 300 is explained using a vehicle as an example, process 300 may be applied to other kinds of durable goods in addition to vehicles. Moreover, process 300 may have stages added, deleted, reordered, or modified without departing from the principles of the invention. For example, stages 340 and 350 may be modified such that the vehicle may be sold for current guaranteed price 130, without the vehicle being used as a trade-in toward the purchase or lease of another vehicle.

Figure 4A:
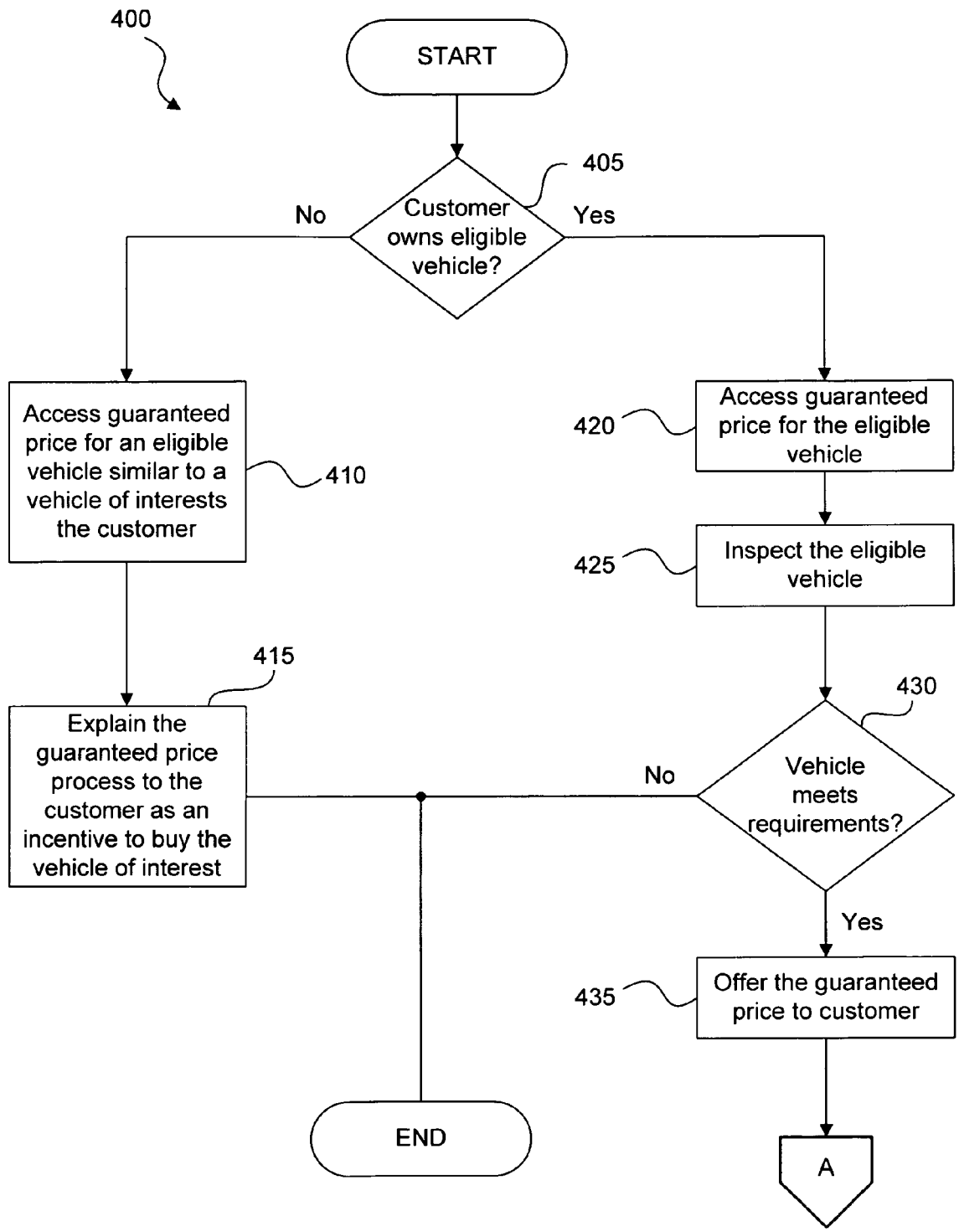
FIGS. 4A and 4B are a diagram illustrating an example of a process for selling a durable good in conjunction with a guaranteed price for a used durable good, consistent with principles of the invention.
Figure 4B:
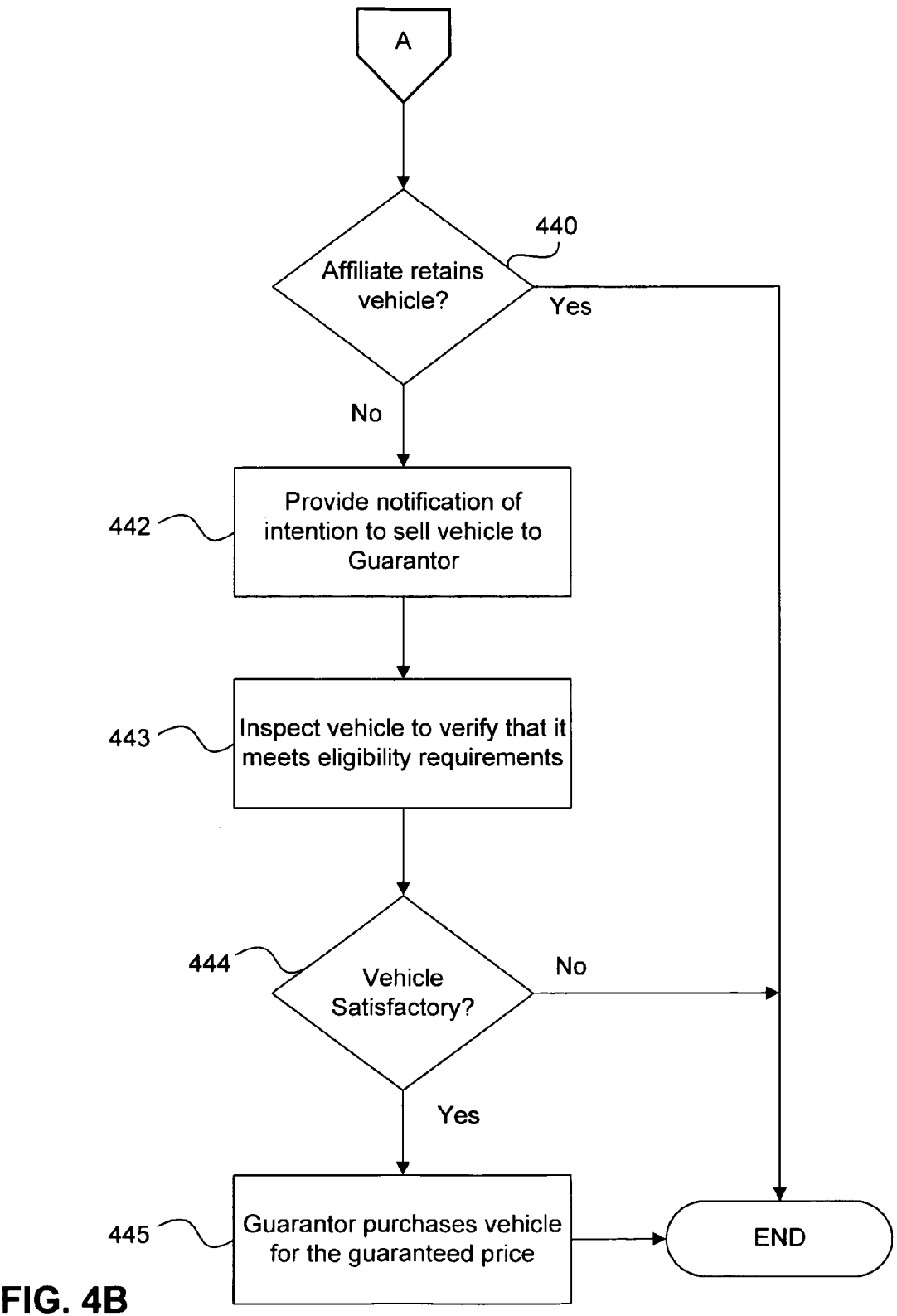

FIGS. 4A and 4B show a flow diagram illustrating an example of a process 400 for selling a durable good in conjunction with a guaranteed price for a used durable good, consistent with the principles of the invention. In the embodiment shown, the durable good is a vehicle.

Process 400 begins by determining whether a customer who wishes to purchase a vehicle owns an eligible vehicle (stage 405). In one embodiment, the vehicle owned by the customer is compared to a set of eligible vehicles to determine whether there is a guaranteed price 130 currently being offered for the vehicle. In one embodiment, this stage may be performed by entering the customer's vehicle's information (e.g., make, model, trim line, model year, VIN, serial number) into a website that provides guaranteed price data.

If the customer's vehicle is not an eligible vehicle (stage 405, No), then a guaranteed price for an eligible vehicle similar to a vehicle that interests the customer is accessed (stage 410). For example, if the customer is interested in purchasing a 2009 Subaru Forester, 2.5X Premium, then a salesperson may access a guaranteed price website and display the current guaranteed price for various used Subaru Forester, 2.5X Premium vehicles, such as 2007, 2006, and 2005 model year vehicles.

At stage 415, an explanation may be given to the customer regarding how the guaranteed price functions to give vehicle owners continuous access to the current value of their used vehicle and to assure owners of eligible used vehicles that they will receive at least the guaranteed price for their eligible used vehicle. This information about availability of a guaranteed used vehicle price gives the customer an incentive to buy the new vehicle that interests the customer. For example, the salesperson may explain that if the customer purchases the 2009 Subaru Forester, 2.5X Premium, then in future years it will have a guaranteed price similar to the 2007, 2006, and 2005 model year guaranteed prices demonstrated on the website. The salesperson may further explain that although the customer may be able to find estimates for other brands of used vehicles, for example using the Online Kelley Blue Book™, those are merely non-binding estimated prices. There is no guarantee that anyone will pay the estimated price listed in the Kelley Blue Book or other guide, and neither Kelley nor anyone else backs up the estimated price with a firm offer to provide the value of the estimated price in exchange for an eligible vehicle. Moreover, with no obligation or guarantee to back up a price estimate, a potential purchaser of a used vehicle has a strong incentive to offer and pay less than the Kelley Blue Book estimated price. The contrast between vehicles that are within the set of vehicles backed by a guarantee price 130 and other vehicles provides an incentive to purchase a vehicle backed by a guaranteed price 130.

As shown at the top of FIG. 4A, if the customer's vehicle is an eligible vehicle (stage 405, Yes), then the current guaranteed price 130 for the customer's eligible vehicle is accessed (stage 420).

In the embodiment shown in process 400, the customer's vehicle is inspected, for example by affiliate 110, to determine whether it is in the condition required to receive current guaranteed price 130 (stage 425). For example, in one embodiment, guaranteed price 130 is limited to vehicles having no more than a predetermined maximum allowable total vehicle mileage at the time of actual trade-in or sale, such as 12,000 miles per year or 15,000 per year, and the vehicle is inspected to determine its total mileage. In another embodiment, the customer's vehicle is inspected to ensure that the vehicle conforms to specified condition criteria, which may require the absence of any condition that significantly reduces the vehicle's value, for example existing and/or previously repaired body damage, cracked and/or broken glass, use as a commercial or rental vehicle, flood damage, not owned by the customer, etc.

If the customer's vehicle does not meet the condition requirements (stage 430, No), then the customer is not entitled to receive guaranteed price 130. In one embodiment, an affiliate 110, such as a car dealer, may offer the customer the value of guaranteed price 130 nonetheless, or offer some other price. But, affiliate 110 in this embodiment would not be entitled to subsequently sell the vehicle to a guarantor 100 for guaranteed price 130. Despite this drawback, affiliate 110 avoids the work of creating an independent offer price for the vehicle and it may profit from paying guarantee price 130 for an unqualified vehicle in certain situations, such as when affiliate 110 already has a buyer lined up for the vehicle at a higher price, or when affiliate 110 has structured a transaction with guaranteed price 130 as a trade-in allowance for a new car, where a high selling price for the new car makes the overall transaction profitable for affiliate 110.

If the customer's vehicle does meet the condition requirements (stage 430, Yes), then the customer is offered current guaranteed price 130 for the vehicle or an adjusted price based on current guaranteed price 130 (stage 435). In one embodiment, current guaranteed price 130 is offered in the form of a trade-in allowance toward the purchase or lease of a new vehicle. In another embodiment, current guaranteed price 130 is offered in the form of a trade-in allowance toward the purchase or lease of a used vehicle, such as a certified used vehicle.

In one embodiment, an adjusted price is offered in place of current guaranteed price 130. For example, if the customer's vehicle exceeds a maximum mileage limit associated with the guaranteed price, then the guaranteed price value offered to the customer is reduced for each mile over the maximum mileage limit, such as a 20 cents per mile reduction. Conversely, if the customer's vehicle's mileage is significantly less than the mileage limit associated with the guaranteed price, then the guaranteed price value offered to the customer may be increased.

As shown in the embodiment of FIG. 4B, when the customer accepts the offer, then the party implementing the guaranteed price offer, such as an affiliate 110, takes ownership of the used vehicle. If the affiliate decides to retain the vehicle (stage 440, Yes), for example to resell the vehicle to another customer, then process 400 ends.

If, on the other hand, affiliate 110 decides not to retain the vehicle (stage 440, No), then affiliate 110 notifies guarantor 100 that affiliate 110 intends to sell the vehicle to guarantor 100 for guaranteed price 130 (stage 442). In one embodiment, the notification may include documents associated with the vehicle and affiliate 110's acquisition of the vehicle, such as a vehicle sale form and agreement signed by affiliate 110, an odometer statement for the vehicle signed by the customer, a copy of the customer's order showing the value provided to the customer in exchange for the vehicle (e.g., the trade-in allowance given to the customer), and the unencumbered title to the vehicle showing assignment to affiliate 110.

In response to affiliate 110's notification, guarantor 100 inspects the used vehicle obtained from the customer and now owned by affiliate 110 to verify that the vehicle complies with the eligibility and condition requirements tied to the guaranteed price offer (stage 443). In one embodiment, guarantor 100 may send a third party inspector to inspect the vehicle at a location specified by affiliate 110, and the third party inspector may examine the vehicle and the vehicle's paperwork. The inspector may verify that the vehicle is an eligible vehicle (e.g., the correct make, model, model year, trim line, ownership history, etc.) and that the vehicle meets the condition and mileage criteria specified in a guaranteed price offer (e.g., meets state and federal safety and emissions standards, in operating condition, no broken glass, no flood, frame, or collision damage, working odometer that has not been tampered with, acceptable paint and finish condition, acceptable tires, etc.).

If the inspector determines that the vehicle is unsatisfactory (stage 444, No), then guarantor 100 is not obligated to purchase the vehicle, and the process ends. In some alternate embodiments, guarantor 100 may nonetheless purchase the vehicle although it did not meet all the eligibility, condition, and/or mileage criteria, but the purchase price may not be equal to guaranteed price 130.

If, on the other hand, the inspector determines that the vehicle is satisfactory (stage 444, Yes), then guarantor 100 purchases the vehicle for guaranteed price 130 (stage 445). In one embodiment, guarantor 100 purchases the vehicle for a value associated with the guaranteed price (e.g., the guaranteed price minus an over mileage adjustment) because the vehicle complies with the mileage and condition criteria and the transaction is in compliance with all the transaction criteria guidelines (e.g., the vehicle was used as a trade-in toward the purchase of new vehicle associated with the guarantor). In this embodiment, although guarantor 100 does not directly provide the value of guaranteed price 130 to an owner 120 of the eligible used vehicle, guarantor 100 enables affiliate 110 to provide the value of current guaranteed price 130 to owner 120 with the assurance that guarantor 100 will reimburse affiliate 100 by later purchasing the vehicle for the amount of guaranteed price 130.

In one embodiment, the reimbursement option provided by guarantor 100 has a time limit, for example, the last day of the next month after affiliate 110 takes ownership of the used vehicle, such that the used vehicle will not age significantly and change value before the guarantor gains possession. For example, if a customer trades in a used vehicle and takes delivery of a new vehicle on November 20, the repurchase option may expire on December 31. In another embodiment, guarantor 100 pays only guaranteed price 130 (possibly adjusted for vehicle mileage) even though affiliate 110 provided more than the value of guaranteed price 130 to the customer.

Although process 400 is explained using a vehicle as an example, process 400 may be applied to other kinds of durable goods in addition to vehicles. Moreover, process 400 may have stages added, deleted, reordered, or modified without departing from the principles of the invention. For example, an affiliate 110 may enter into a transaction with a vehicle owner 120 and take ownership of a used vehicle in exchange for the value of guaranteed price 130 without first inspecting the vehicle (e.g., without performing stages 430 and/or 435). In this embodiment, guarantor 100 purchases the vehicle from affiliate 110 for guaranteed price 130, as adjusted for over mileage, etc. The guarantor 100 then arranges to have the used vehicle inspected, for example, by an independent inspection service. If the inspection determines that the used vehicle conforms to the mileage and condition criteria, then no further action is required from affiliate 110. If, however, the inspection reveals a condition that disqualifies the vehicle, e.g., existing and/or previously repaired body damage, cracked and/or broken glass, etc., then affiliate 110 must buy back the vehicle from guarantor 100 for the amount paid by guarantor 100. Other ways for guarantor 100 to reimburse an affiliate 110 may also be used. Furthermore, in some embodiments guarantor 100 performs the affiliate 110's functions, such that there is no separate affiliate 110.

Figure 5:
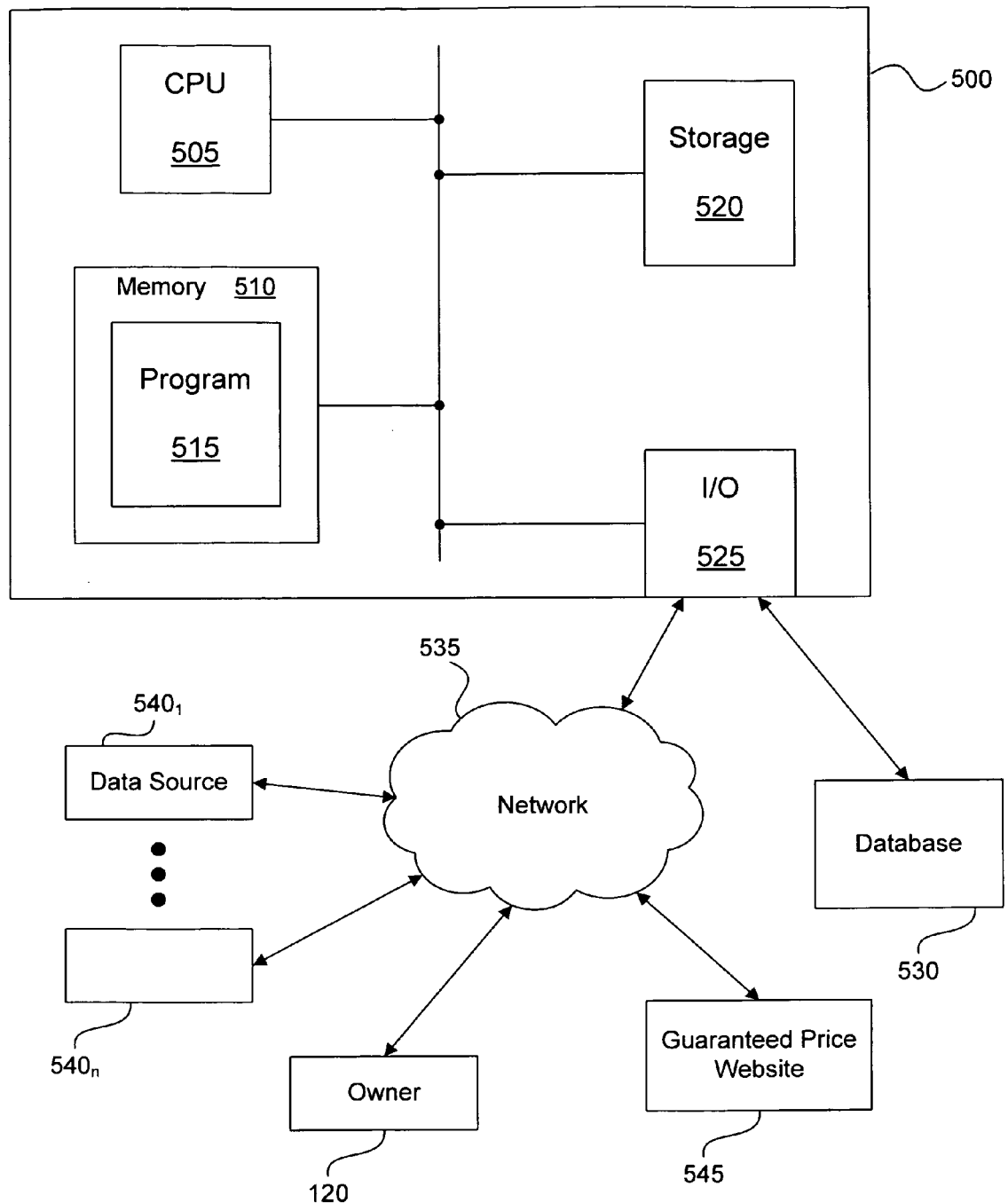
FIG. 5 is a block diagram illustrating a data processing system for providing a guaranteed price for a used durable good, consistent with principles of the invention.

FIG. 5 illustrates an exemplary computing system 500 that may be used to implement embodiments of the invention. The components and arrangement, however, are not critical to the present invention.

Data processing or computing system 500 includes a number of components, such as a central processing unit (CPU) 505, a memory 510, an input/output (I/O) device(s) 525, a nonvolatile storage device 520, and a database 530. System 500 can be implemented in various ways. For example, an integrated platform (such as a workstation, personal computer, laptop, etc.) may comprise CPU 505, memory 510, nonvolatile storage 520, and I/O devices 525. In such a configuration, components 505, 510, 520, and 525 may connect through a local bus interface and access database 530 (shown implemented as a separate database system) via an external connection. This connection may be implemented through a direct communication link, a local area network (LAN), a wide area network (WAN) and/or other suitable connections. System 500 may be standalone or it may be part of a subsystem, which may, in turn, be part of a larger system, such as a used durable goods pricing system or a new durable goods sales incentive system.

CPU 505 may be one or more known processing devices, such as a microprocessor from the Pentium™ family manufactured by Intel™. Memory 510 may be one or more storage devices configured to store information used by CPU 505 to perform certain functions related to embodiments of the present invention. Storage 520 may be a volatile or non-volatile, magnetic, semiconductor, tape, optical, or other type of storage device or computer-readable medium. In one embodiment consistent with the invention, memory 510 includes one or more programs or subprograms 515 loaded from storage 520 that, when executed by CPU 505, perform various procedures or processes consistent with the present invention. For example, memory 510 may include a guaranteed price calculation program 515 that periodically calculates a guaranteed trade-in price for a set of vehicles. Memory 510 may also include other programs that perform other functions and processes, such as programs that provide eligibility, price, and condition information to a website accessible to the public.

Methods, systems, and articles of manufacture consistent with the present invention are not limited to programs or computers configured to perform dedicated tasks. For example, memory 510 may be configured with a program 515 that performs several functions when executed by CPU 505. That is, memory 510 may include a program 515 that periodically gathers vehicle price estimate information from various websites and information sources, calculates a guaranteed trade-in price for a set of vehicles, and serves eligibility, price, and condition information to a website accessible to the public. Alternatively, CPU 505 may execute one or more programs located remotely from system 500. For example, system 500 may access one or more remote programs that, when executed, perform functions related to embodiments of the present invention.

Memory 510 may be also be configured with an operating system (not shown) that performs several functions well known in the art when executed by CPU 505. By way of example, the operating system may be Microsoft Windows™, Unix™, Linux™, an Apple Computers operating system, Personal Digital Assistant operating system such as Microsoft CE™, or other operating system. The choice of operating system, and even to the use of an operating system, is not critical to the invention.

I/O device(s) 525 may comprise one or more input/output devices that allow data to be received and/or transmitted by system 500. For example, I/O device 525 may include one or more input devices, such as a keyboard, touch screen, mouse, and the like, that enable data to be input from a user, such as data identifying vehicles in a set of vehicles participating in a guaranteed price program and data defining rules for periodically calculating guaranteed prices for used durable goods. Further, I/O device 525 may include one or more output devices, such as a display screen, CRT monitor, LCD monitor, plasma display, printer, speaker devices, and the like, that enable data to be output or presented to a user. I/O device 525 may also include one or more digital and/or analog communication input/output devices that allow computing system 500 to communicate with other machines and devices, such as data sources $540_1$, through $540_n$, either directly or through a network 535. System 500 may input data from external machines and devices and output data to external machines and devices via network 535. The configuration and number of input and/or output devices incorporated in I/O device 525 are not critical to the invention.

Network 535 may also be connected to a guaranteed price website 545, which has an interface that allows users, such as owner 120, to access the current guaranteed price of a durable good. Guaranteed price website 545 may provide the current guaranteed price of a durable good fetched from database 530 via system 500, whereas program 515 periodically recalculates the guaranteed price of the durable good and stores the recalculated guaranteed price in database 530. Other entities in addition to those shown may connect to network 535 and interact with the entities shown.

Database 530 may comprise one or more databases that store information and are accessed and/or managed through system 500. By way of example, database 530 may be an Oracle™ database, a Sybase™ database, or other relational database. Database 530 may include, for example, current guaranteed prices for a set of vehicles, price estimates for the vehicles gathered from various sources (e.g., data sources $540_1$ through $540_n$), recent auction prices for vehicles in the set of vehicles, etc. Systems and methods of the present invention, however, are not limited to separate databases or even to the use of a database.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method, using a data processing system, for re-purchasing durable good sold by a seller to an owner of the durable good, comprising:
    continually offering, to the owner by a purchasing entity using the data processing system, to re-purchase the durable good at a value equal to or greater than a guaranteed price, the purchasing entity being one of the seller or an entity affiliated with the seller;
    periodically calculating a guaranteed price, using the data processing system, the calculating incorporating at least one standard industry price estimate;
    automatically removing, from the data processing system, offers for durable goods that reach an age threshold;
    receiving a request from the owner to display, via an owner-accessible interface of the data processing system, the guaranteed price;
    displaying the guaranteed price to the owner, via the owner-accessible interface;
    receiving a request from the owner for the purchasing entity to re-purchase the durable good; and
    re-purchasing the durable good by the purchasing entity for the value equal to or greater than the guaranteed price.

2. The method of claim 1, wherein the durable good is a vehicle.

3. The method of claim 1 wherein the value equal to or greater than the guaranteed price is a trade-in allowance towards the purchase of a new durable good.

4. The method of claim 1, wherein periodically calculating further comprises:
    calculating the guaranteed price for the durable good to be higher than the standard industry price estimate.

5. The method of claim 1, further comprising:
    adjusting the value for re-purchasing the durable good according to a condition of the durable good.

6. The method of claim 5, wherein the condition of the durable good is determined by an inspection.

7. The method of claim 1, wherein the re-purchasing of the durable good further comprises:
    paying, to the owner, by the purchasing entity, a price equal to the value provided to the owner to purchase the durable good; and
    obtaining, from the owner, by the purchasing entity, the durable good.

8. The method of claim 1, further comprising:
    incentivizing the owner to purchase a new durable good by informing the owner of the continual offering of the transaction.

9. The method of claim 1, wherein the owner-accessible interface is a website interface.

10. The method of claim 1, further comprising:
    reselling the durable good re-purchased from the owner.

11. A computer-implemented method using a data processing system, for selling or leasing a new vehicle comprising:
    periodically calculating guaranteed prices for at least two previous model years of vehicles made by a manufacturer of the new vehicle, using a computing system, the calculating incorporating at least one standard industry price estimate;
    continually offering an owner of a previous model year vehicle a trade-in allowance toward the purchase or lease of the new vehicle, the trade-in allowance being equal to a current guaranteed price calculated for the previous model year vehicle, using the data processing system;
    automatically removing, from the data processing system, offers for previous model year vehicles that exceed an age threshold;
    receiving a request from the owner of the previous model year vehicle to display, via the owner-accessible interface of the data processing system, the guaranteed price of the previous model year vehicle;
    displaying the guaranteed price to the owner, via the owner-accessible interface; and
    selling or leasing the new vehicle to the owner of the previous model year vehicle for a new vehicle price discounted by the trade-in allowance for the current guaranteed price, when the previous model year vehicle is traded in.

12. The method of claim 11, wherein the vehicle is an automobile.

13. The method of claim 11, wherein periodically calculating further comprises:
    calculating the guaranteed prices to be higher than the at least one standard industry price estimate.

14. The method of claim 11, further comprising:
    adjusting the allowance offered to the owner according to a condition of the previous model year vehicle traded in.

15. The method of claim 14, wherein the condition of the previous model year vehicle traded is determined by an inspection.

16. The method of claim 11, further comprising:
    paying, to the owner, by a purchasing entity, a price equal to the trade-in allowance provided to the owner to purchase the previous model year vehicle, the purchasing entity being the manufacturer or an entity related to the manufacturer; and
    obtaining, from the owner, by the purchasing entity, the previous model year vehicle.

17. The method of claim 16, further comprising:
    reselling the previous model year vehicle obtained by the purchasing entity.

18. The method of claim 11, further comprising:
    incentivizing an owner to purchase the new vehicle by informing the owner of the guaranteed prices for the at least two previous model years of vehicles made by a manufacturer of the new vehicle and the continually offered trade-in allowance.

19. The method of claim 11, wherein the owner-accessible interface further comprises:
    an owner-accessible website.

20. A system for providing a guaranteed price used in a transaction for a vehicle, comprising:
   a guarantor computing component controlled by a guarantor that performs operations including:
      defining a set of listings of used vehicles eligible for the transaction,
      removing a used vehicle listing from the set of listings of used vehicles when the corresponding used vehicle exceeds an age threshold,
      periodically calculating current guaranteed prices corresponding to the used vehicles in the set of listings of used vehicles, the calculating incorporating at least one standard industry price estimate,
      storing terms of the transaction, which uses the current guaranteed prices, and
      providing access to the calculated current guaranteed prices and the terms of the transaction;
   a web server, communicatively connected to the guarantor computing component via a network, the web server performing operations comprising:
      accepting information identifying a used vehicle from an owner of the used vehicle,
      retrieving the calculated current guaranteed price corresponding to the used vehicle and the terms of the transaction, which uses the calculated guaranteed price, via the guarantor computing component,
      displaying an offer to enter into the transaction and the terms of the transaction to the owner of the used vehicle, and
      displaying the calculated current guaranteed price corresponding to the used vehicle to be used in the transaction to the owner of the used vehicle; and
   an affiliate computing component, communicatively connected to the guarantor computing component and the web server via the network, the affiliate computing component performing operations comprising:
      displaying the calculated current guaranteed price for the used vehicle and the terms of the transaction to an affiliate that enters into the transaction with the owner of the used vehicle, wherein the affiliate takes ownership of the used vehicle in exchange for a value equivalent to the calculated current guaranteed price, and
      facilitating sale of the used vehicle from the affiliate to the guarantor for the current guaranteed price.

21. The system of claim 20, wherein the used vehicle is an automobile, the guarantor is an automobile manufacturer of the used vehicle, and the affiliate is a dealer associated with the automobile manufacturer.

22. The system of claim 20, wherein the transaction includes trading in the used vehicle in exchange for a reduction of the price of a new vehicle that is based on the calculated current guaranteed price of the used vehicle.

* * * * *

UNITED STATES PATENT AND TRADEMARK OFFICE
CERTIFICATE OF CORRECTION

| | |
|---|---|
| PATENT NO. | : 8,392,264 B2 |
| APPLICATION NO. | : 12/230428 |
| DATED | : March 5, 2013 |
| INVENTOR(S) | : Thomas J. Doll |

It is certified that error appears in the above-identified patent and that said Letters Patent is hereby corrected as shown below:

In the Claims:

In claim 1, column 13, line 26, "re-purchasing durable good" should read --re-purchasing a durable good--.

Signed and Sealed this
Twenty-first Day of May, 2013

Teresa Stanek Rea
*Acting Director of the United States Patent and Trademark Office*